United States Patent [19]
Bechtold

[11] Patent Number: 4,729,542
[45] Date of Patent: Mar. 8, 1988

[54] MOLD FOR PRODUCING CONNECTING STRAPS FOR LEAD BATTERIES

[75] Inventor: Dieter Bechtold, Frankfurt, Fed. Rep. of Germany

[73] Assignee: Varta Batterie Aktiengesellschaft, Hanover, Fed. Rep. of Germany

[21] Appl. No.: 771,940

[22] Filed: Sep. 3, 1985

[30] Foreign Application Priority Data

Sep. 22, 1984 [DE] Fed. Rep. of Germany ....... 3434901

[51] Int. Cl.⁴ .............................................. B22C 9/06
[52] U.S. Cl. ...................................... 249/96; 164/125; 164/332; 249/135
[58] Field of Search ......... 164/332, 122, 125, DIG. 1, 164/348; 249/96, 97, 135

[56] References Cited

U.S. PATENT DOCUMENTS

| | | | |
|---|---|---|---|
| 2,004,340 | 6/1935 | Patterson | 164/112 |
| 3,395,748 | 8/1968 | Tiegel | 164/332 X |
| 3,598,171 | 8/1971 | Schulz | 164/471 X |
| 4,005,511 | 2/1977 | Muusse | 164/125 X |
| 4,108,417 | 8/1978 | Simonton et al. | 164/348 X |
| 4,327,890 | 5/1982 | Cattano | 164/332 X |

FOREIGN PATENT DOCUMENTS 1067899 10/1959 Fed. Rep. of Germany.

OTHER PUBLICATIONS

Abstract of French Pat. No. 57,972.

Primary Examiner—Nicholas P. Godici
Assistant Examiner—J. Reed Batten, Jr.
Attorney, Agent, or Firm—Weiser & Stapler

[57] ABSTRACT

A mold for producing connecting straps for lead batteries, particularly according to a cast-on-strap (COS) process or the like, is especially adapted for the simultaneous casting-in of a pole insert, and has wall thicknesses which vary inversely to changes in the thickness of the connecting strap. Heat transition adjusted to the local accumulation of material on the casting is thus achieved, and the development of unequal temperature conditions during the entire casting process is avoided.

8 Claims, 6 Drawing Figures

U.S. Patent    Mar. 8, 1988    4,729,542
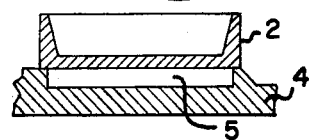
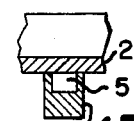
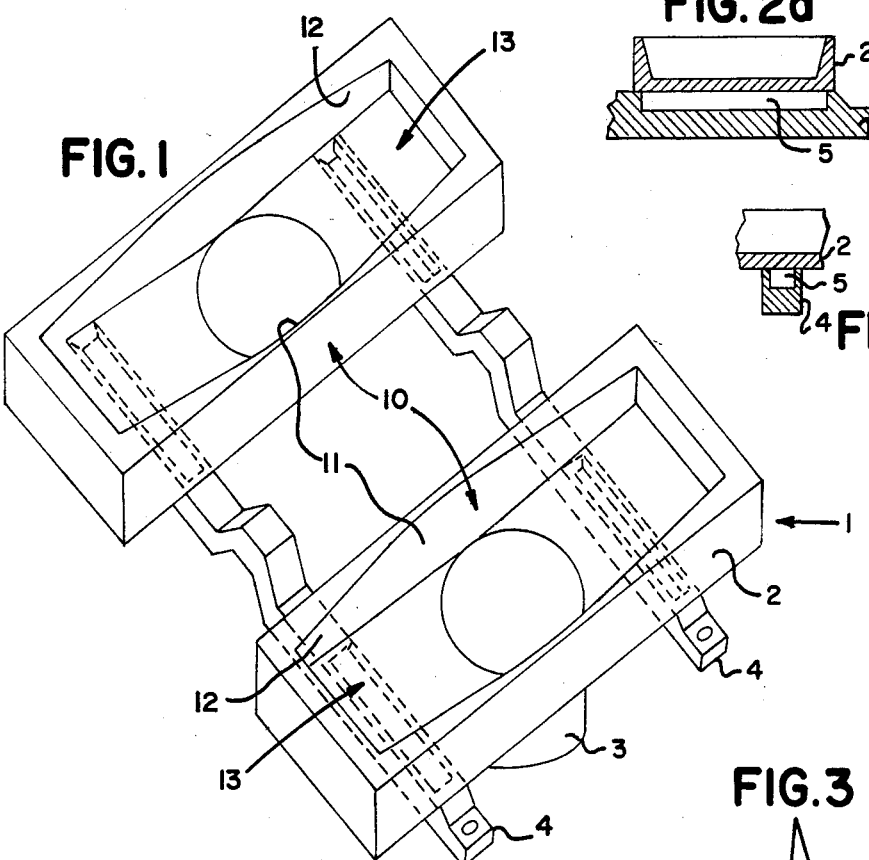
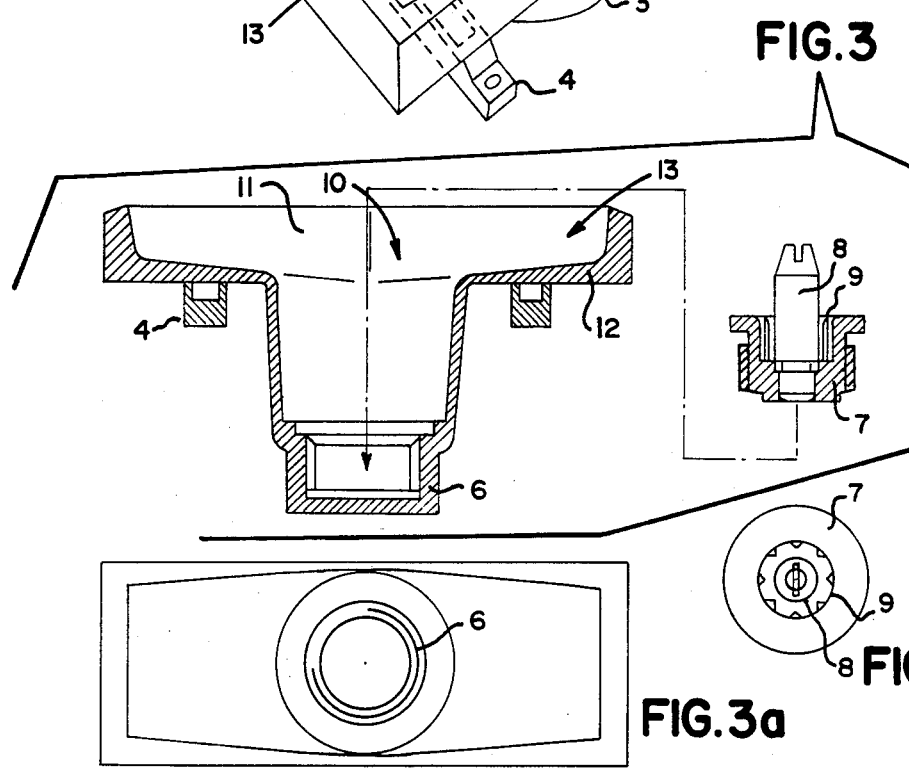

MOLD FOR PRODUCING CONNECTING STRAPS FOR LEAD BATTERIES

BACKGROUND OF THE INVENTION

The present invention relates generally to a mold for producing connecting straps for lead batteries, and in particular, to an improved mold useful in a cast-on-strap (COS) process or the like.

It has long been known, for example from DE-PS No. 1,067,899, that the plate lugs of a group of battery plates of the same polarity can be connected to a corresponding connecting strap by melting lead in a mold having the contours of the connecting strap, including the cell pole, and by dipping the lugs into the melt. This is the so-called cast-on-strap (COS) process, which permits homogeneous connection of the lugs with the connecting straps. After cooling, the connecting strap and the pole are removed from the mold as a one-piece casting. Efficient temperature regulation is extremely important in incorporating these operations into a continuous and efficient production process.

In the manufacture of battery plate groups according to the cast-on-strap (COS) process, a mold designed as a ladle and having a shape which corresponds to the connecting strap and pole to be cast, is first dipped into a melting kettle containing a molten metal, for preheating according to U.S. Pat. No. 2,004,340, for example. The mold is then filled by scooping the appropriate amount of lead from the kettle. The series of battery plates are then dipped into the mold with the plate lugs in an inverted position, whereupon the mold is then intensely chilled by cooling with water. For this purpose, the ladle can be placed into a chilling tank or the like.

In conventional battery constructions, the cross section of the connecting strap tapers in both directions, from the center of the strap longitudinally to its ends. This unequal distribution of material over the length of the strap leads to differences in the rate of heat exchange with the surrounding medium, so that the thinner ends reach the temperature favorable for casting-on of the lugs sooner than the center section, and so that the amount of heat absorbed by the center section of the connecting strap in accordance with the amount of material gathered, tends to accumulate during the cooling phase, causing irregular heat flow.

It is therefore the primary object of the present invention to avoid temperature variations within the molten material during the melting and cooling phases, to the extent possible, during the manufacture of connecting straps and cell poles according to the cast-on-strap (COS) process; in order to create homogeneous casting conditions for the plate lugs at all points along the connecting strap.

SUMMARY OF THE INVENTION

This and other objects are achieved according to the present invention by providing a mold useful in preparing connecting straps and connection poles for lead batteries by means of the cast-on-strap (COS) or similar process wherein the thicknesses of the walls of the mold are varied in inverse proportion to variations in the local accumulations (thickness and width) of material over the length of the connecting strap, and wherein a pole insert made from a material with an electrical conductivity higher than that of lead is securely received in the portion of the mold which is to form the cell connection terminal.

The improvements of the present invention derive from the fact that the material of the mold (preferably titanium) participates in the heat exchange during all phases of heat treatment in accordance with its specific thermal conductivity and the thickness of the walls of the mold. It has been found that heat transitions corresponding to changes in the contours of the castings from place to place can be achieved when the thickness of the walls of the mold is always opposite or inversely proportional to the local accumulations of material. This means that those areas of the casting having the larger lead accumulations are surrounded by a smaller amount of mold material, and vice versa. As a result, the dissipation of heat from the thinner ends of the connecting straps is retarded by the heat which is stored in the correspondingly thickened mold walls, and the rate of the cooling at these ends is brought to a value close to the rate of cooling of the central sections of the connecting strap so as to achieve a certain degree of synchronous cooling.

For further detail regarding strap molding according to the present invention, reference is made to the detailed description which follows, taken in connection with the following illustrations.

BRIEF DESCRIPTION OF THE DRAWINGS

FIG. 1 is an isometric view showing a pair of molds according to the present invention in a combined arrangement.

FIGS. 2a and 2b are partial, cross-sectional views showing different isolated mold fasteners.

FIG. 3 is an exploded, cross-sectional view of the mold, prepared for receiving a pole insert.

FIGS. 3a and 3b are top plan views of the structure illustrated in FIG. 3.

In the several views provided, like reference numerals denote similar structure.

DETAILED DESCRIPTION OF A PREFERRED EMBODIMENT

FIG. 1 shows a pair of molds 1 having a portion 2 which corresponds to the connecting strap to be cast, and a portion 3 which corresponds to the pole. The pair of molds 1 are fastened together by two holders 4 at such a spacing that the casting-on of the plate lugs of both polarities of a battery cell can be performed in a single operation.

Since the means used to fasten together the molds 1 also act as heat-conducting bridges, these holders 4 also represent a sensitive source of interference to the avoidance of temperature variations (inhomogeneities) within the casting resulting from the specific accumulations of lead in certain areas of the molds 1.

In accordance with the present invention, such inhomogeneities are avoided by varying the thickness of the walls of the molds 1 in inverse proportion to variations in the local accumulations of material over the length of the connecting straps. Thus, those portions 10 of the mold 1 having the larger lead accumulations, such as at the center of the connecting straps, are provided with mold walls 11 which are thinner relative to the mold walls 12 provided along those portions 13 of the mold 1 having the smaller lead accumulations, such as at the ends of the connecting straps. Preferably, the thickness of the walls of the mold 1 varies progressively along the length of the mold 1 between these two regions.

To further avoid inhomogeneities in the resulting casting, an especially preferred embodiment of the present invention makes use of hollow fastening means or holders 4 to fasten together the molds 1. The molds 1 are welded to these holders 4 only along thin webs of material, having a width on the order of about 1 mm, such that an enclosed space 5 is developed which provides for a certain amount of heat insulation between the molds 1 and the mold holders 4. FIGS. 2a and 2b illustrate two such holder embodiments.

Further in accordance with the present invention, means are provided for facilitating the simultaneous casting-in of a pole insert, made from a metal with a higher electrical conductivity than that of the lead pole. To this end, the portions 3 of the mold 1 which correspond to the pole are provided with a cup shaped extension 6, as shown in FIGS. 3 and 3a, for receiving a correspondingly cup-shaped tool 7 made from hardened steel, as shown in FIGS. 3 and 3b, which is capable of being screwed into the extension 6. A guide pin 8, which is also made from hardened steel, is concentrically screwed into the bottom of the tool 7. As is shown with particular reference to the top view of FIG. 3b, the tool 7 is provided with an inner contour 9 having vertical edges or fins which can be prepared, for example, by spark erosion.

Previously, it was not uncommon for the sleeve-shaped pole inserts (made from brass or copper) which were traditionally received and centered within the mold by a three-cornered or similar holder, to float up in the molten lead when the mold was filled, because of the higher specific gravity of lead, and because the sleeve material tended to expand during heating to a greater degree than the material of the receiving holder (generally steel). This caused the sleeve to become detached from the holder. This problem is effectively eliminated by the cup-shaped tool 7 according to the present invention since the tool 7 acts as a fixed stop for the brass insert (not shown) which is centered by the guide pin 8, and because the tool 7 expands radially outwardly upon heating. As a result, the pole insert (sleeve) is pressed onto the edges of the inner contour 9 due to the stresses which are generated by its own expansion, to remain safely fixed in its correct position during the casting procedure. The profile of the inner contour 9 is further designed in such a way as to prevent molten lead from penetrating into the upwardly open gap which is developed.

During cooling of the casting in the cooling water of the chilling tank, at the end of the cast-on process, the mold 1 is dipped into the cooling water with the portion 3 which receives the pole insert first. Accordingly, the portion 3 remains in the cooling water for a longer period of time. As a consequence of this, although all of the elements in this region shrink, the pole insert shrinks more intensely than the receiving tool 7, so that removal of the pole insert from the mold 1 after this shrinkage is achieved without the application of any significant force.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a mold for preparing connecting straps and end terminals for lead batteries by dipping the mold, which has portions corresponding to the connecting strap and to the end terminal, into molten lead to scoop up an amount of lead sufficient to fill the mold, and by bringing the content of the mold up from the bottom and together with inverted plate lugs of grouped battery plates, to fuse the plate lugs together with the content of the mold prior to solidification, the improvement comprising:

mold walls, the thickness of which vary in inverse proportion to the local accumulation of material on the connecting strap, over the length of the connecting strap; and means for receiving a pole insert made from a material with an electrical conductivity higher than that of lead in portions of the mold which are to form the end terminal.

2. The mold of claim 1 wherein the mold is attached to a mold holder only along edges of the mold holder so that a hollow space is developed between the mold and the mold holder.

3. The mold of claim 1 wherein the portion of the mold which corresponds to the end terminal has a cup-shaped extension adapted to receive a correspondingly cup-shaped tool for receiving the pole insert, said tool having an interior wall having contoured vertical edges.

4. The mold of claim 3 wherein the receiving tool is provided with a guide pin for the pole insert.

5. A mold for preparing connecting straps and end terminals for lead batteries, said mold having portions for casting a connecting strap and portions for casting an end terminal, wherein the walls of the mold have a thickness which varies in inverse proportion to the local accumulation of material on the connecting strap, over the length of the connecting strap.

6. The mold of claim 5 wherein said wall thickness increases progressively from the center of the strap molding portions of the mold to the ends of the strap molding portions of the mold.

7. A mold for preparing connecting straps and end terminals for lead batteries, said connecting straps having a thickness which varies along said connecting straps, and said mold having portions for casting said connecting straps and portions for casting said end terminals, wherein the walls of said mold have a local thickness which varies in inverse proportion to the local thickness of the connecting straps, at positions along the length of the connecting straps.

8. The mold of claim 7 wherein said connecting strap thickness decreases progressively from the center of the connecting straps, and wherein said wall thickness correspondingly increases progressively from the center of the strap casting portions of the mold to the ends of the strap casting portions of the mold.

* * * * *